United States Patent
DeVlieg et al.

(10) Patent No.: US 8,386,094 B2
(45) Date of Patent: Feb. 26, 2013

(54) TAXI BRAKE INHIBIT SYSTEM

(75) Inventors: Garrett H. DeVlieg, Bellevue, WA (US); John Gowan, Edmonds, WA (US)

(73) Assignee: Hydro-Aire, Inc., Burbank, CA (US)

( * ) Notice: Subject to any disclaimer, the term of this patent is extended or adjusted under 35 U.S.C. 154(b) by 476 days.

(21) Appl. No.: 12/695,121

(22) Filed: Jan. 27, 2010

(65) Prior Publication Data

US 2010/0222942 A1   Sep. 2, 2010

Related U.S. Application Data

(60) Provisional application No. 61/148,248, filed on Jan. 29, 2009, provisional application No. 61/225,519, filed on Jul. 14, 2009.

(51) Int. Cl.
*B64C 25/42* (2006.01)
*B60T 17/18* (2006.01)
*G06F 19/00* (2006.01)

(52) U.S. Cl. ............ 701/3; 701/70; 701/90; 303/126; 244/111

(58) Field of Classification Search .......... 701/3, 70, 701/90; 303/126, 176, 20; 188/158, 71.1; 244/111
See application file for complete search history.

(56) References Cited

U.S. PATENT DOCUMENTS

| | | | | |
|---|---|---|---|---|
| 4,923,056 A | * | 5/1990 | Nedelk | 188/71.1 |
| 4,986,610 A | * | 1/1991 | Beck et al. | 303/176 |
| 5,845,975 A | * | 12/1998 | Wells | 303/126 |
| 6,851,649 B1 | * | 2/2005 | Radford | 244/111 |
| 7,228,945 B2 | | 6/2007 | O'Neill | |
| 7,281,684 B2 | * | 10/2007 | Steiner et al. | 244/111 |
| 2005/0040286 A1 | | 2/2005 | Radford | |
| 2006/0226698 A1 | * | 10/2006 | Riebe et al. | 303/20 |
| 2010/0063703 A1 | * | 3/2010 | Clothier | 701/90 |
| 2010/0286881 A1 | * | 11/2010 | Cahill | 701/70 |

FOREIGN PATENT DOCUMENTS

| | | |
|---|---|---|
| EP | 0329373 A1 | 8/1989 |
| EP | 0384071 A1 | 8/1990 |
| EP | 1588912 A1 | 10/2005 |
| EP | 1693262 A1 | 8/2006 |
| EP | 1712441 A1 | 10/2006 |
| WO | 9608396 A1 | 3/1996 |

\* cited by examiner

*Primary Examiner* — Tan Q Nguyen
(74) *Attorney, Agent, or Firm* — Fulwider Patton LLP

(57) ABSTRACT

A taxi brake inhibit system overcomes problems of discontinuities in pedal "feel" that can occur by use of a taxi brake inhibit system, by adding a new pedal "feel" logic in which twice the brake force is commanded for a given brake pedal application when taxi brake inhibit is active. The taxi brake inhibit system relies upon two different brake force vs. brake pedal application curves to compensate for the difference in deceleration that is achieved for a given brake pedal application depending upon whether the taxi brake inhibit is active or inactive. Such system effectively eliminates undesirable deceleration bumps, yaw effects and changes in pedal feel during braking. The taxi brake inhibit feature is also shut off to both fore-aft brake pairs if any non-normal taxi brake inhibit condition exists on either fore-aft brake pair.

10 Claims, 11 Drawing Sheets

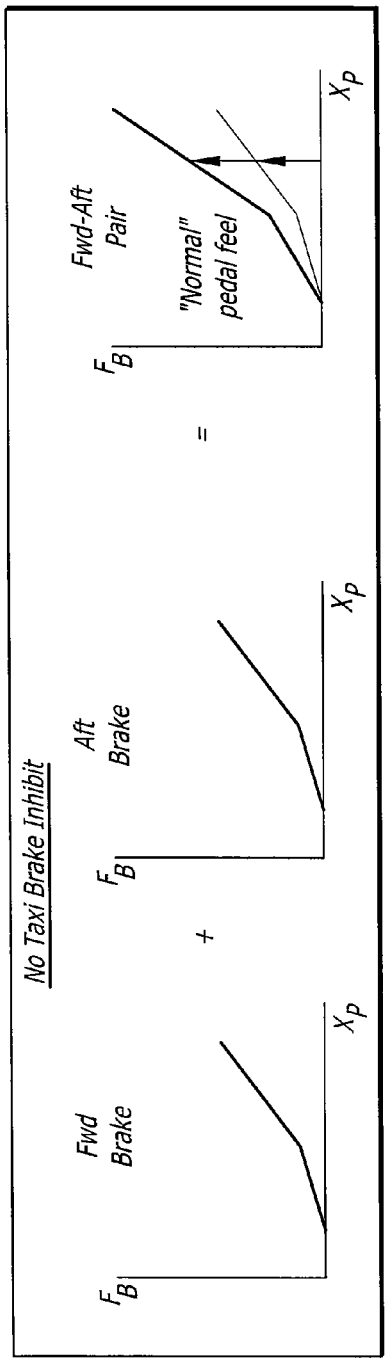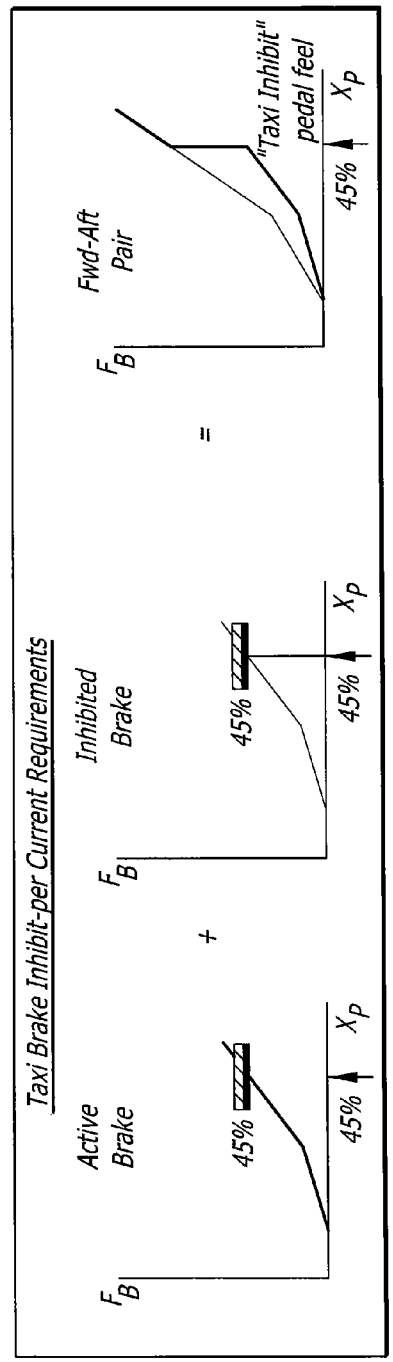

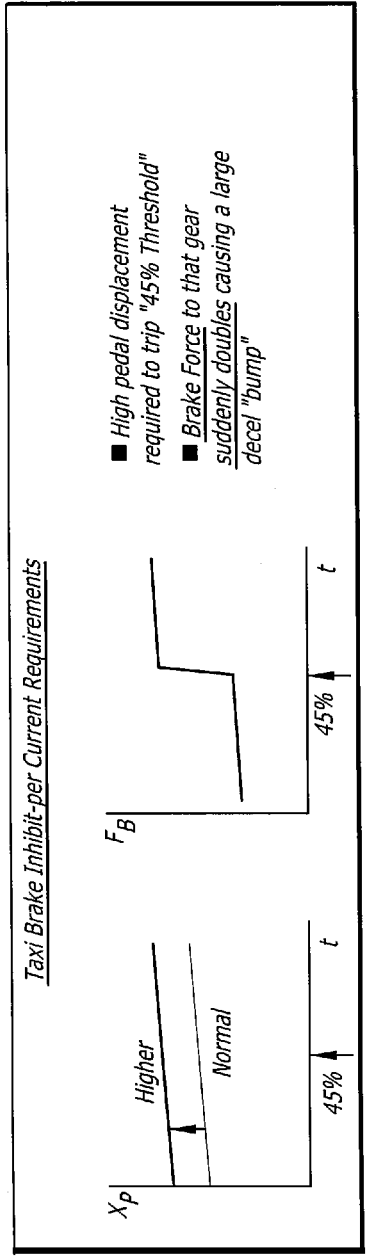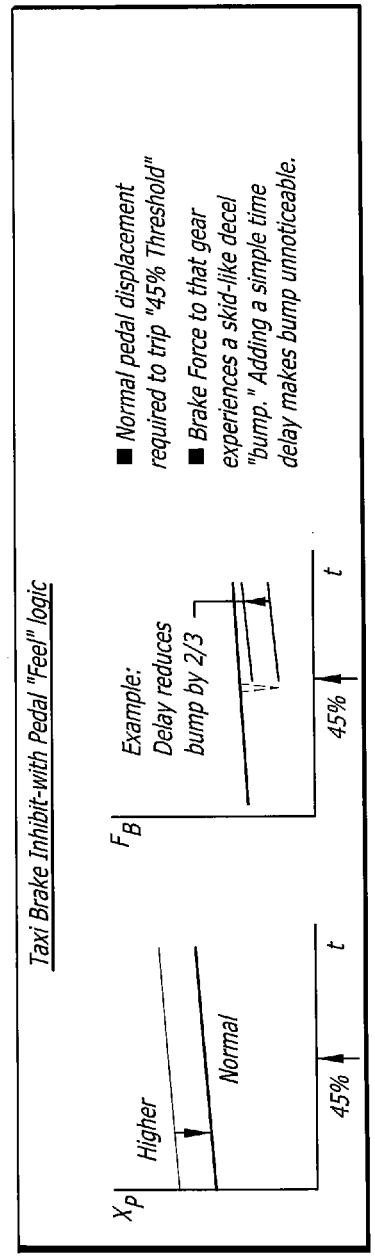

FIG. 19

C=Current Requirements
P=Proposed Requirements

| Non-Normal Conditions | 2x Overheat | | 4x Torque | | Lockup Exposure | |
|---|---|---|---|---|---|---|
| | C | P | C | P | C | P |
| Brake Deactivated | 2x | - | - | - | - | - |
| 1 brake-no antiskid | 2x | - | 4x | - | 2x | 1x |
| 1 brake-no braking | 2x | - | 4x | - | - | - |
| 2 brakes-no antiskid | - | - | - | - | 2x | 1x |
| 2 brakes-no braking | 2x | 2x | 4x | - | - | - |

TAXI BRAKE INHIBIT SYSTEM

CROSS-REFERENCES TO RELATED APPLICATIONS

This application is based upon and claims priority from Provisional Patent Application No. 61/148,248, filed Jan. 29, 2009, and Provisional Patent Application No. 61/225,519, filed Jul. 14, 2009, the contents of which are incorporated by reference herein in their entirety.

BACKGROUND OF THE INVENTION

The present invention generally relates to aircraft braking systems and more particularly pertains to improvements in taxi brake inhibit systems that reduce carbon brake wear.

Carbon brakes are fitted to many modern aircraft that are designed to carry large passenger or cargo payloads. Such brakes rely on the use of a carbon composite material to serve as friction material as well a heat sink. A stack of carbon rotor disks and carbon stator disks are coaxially arranged in an alternating sequence along a wheel's axis wherein the rotor disks are rotationally keyed to the wheel while the stator disks are keyed to the stationary axle. Braking force is generated by the pressurization of piston actuators that are configured to compress the stack between a pressure plate and a backing plate to thereby cause the friction surfaces of adjacent disks to engage one another. While carbon brakes are preferred for weight and performance reasons over steel brakes, the cost of replacing the stack as a function of landing cycles between replacements is much higher than for steel brakes.

In contrast to conventional steel brakes for which brake life is largely determined by the total amount of energy that is absorbed, carbon brakes wear as a function of the number of times the brakes are applied, since wear is highest upon initial brake application when the brake temperature is low. Consequently, most carbon brake wear tends to occur during taxiing as the brakes may be applied routinely dozens of times in negotiating the taxiways between the runway and the gate and during the stop-and-go traffic that may be encountered in the queue for take off.

Braking systems have been devised to reduce the number of brake applications and hence the wear rate of carbon brakes by disabling one or more brakes during low energy brake applications, i.e. during taxiing. As such, individual brakes are subject to a lower number of brake applications while the increased braking load during each application has no adverse effect on wear. Such systems may be relied upon to determine the sequence of brake disablements so as to achieve an even wear rate among the various braked wheels without compromising stopping ability and without adversely affecting the stability of the aircraft. Nonetheless, such systems may suffer from certain shortcomings, including harsh and objectionable changes in deceleration rate ("deceleration bumps"), undesirable yaw forces that require countersteer, and changes in brake "feel" when taxi brake inhibit thresholds are exceeded.

Referring to FIG. 1, in the current Boeing 787 aircraft taxi brake inhibit system, without taxi brake inhibit in operation, all taxi brakes operate, and taxi brake energy or brake force ($F_B$) distributes simultaneously to all of the aircraft brakes of the landing gear, resulting in normal brake pedal "feel." However, as is illustrated in FIG. 2, during operation of conventional Boeing 787 aircraft taxi brake system with a conventional taxi brake inhibit mode in operation, in a first brake configuration (1), a first half of the brakes operate with taxi brake energy or brake force ($F_B$), and a second half of the brakes operate with zero taxi brake energy or brake force ($F_B$), and in a second brake configuration (2), the second half of the brakes operate with taxi brake energy or brake force ($F_B$), and the first half of the brakes operate with zero taxi brake energy or brake force ($F_B$), and the brakes alternate in this manner at each normal taxi brake application to improve carbon brake life, so that twice the torque is applied half the time and the taxi brake energy or brake force ($F_B$) is thereby evenly distributed to all brakes.

However, as is illustrated in FIGS. 3 and 4, depicting brake force ($F_B$) vs. corresponding brake pedal displacement ($X_P$) for operation of aircraft brakes without and with conventional implementation of a taxi brake inhibit mode, application of half the brakes during normal taxi brake operation is typically implemented according to a specific curve of brake force command ($F_B$) vs. brake pedal application ($X_P$), and results in a brake pedal "feel" that provides only half the airplane deceleration per unit pedal force when taxi brake inhibit is active. This in turn results in doubling the change in brake pedal "feel" between taxi brake inhibit "ON" and "OFF", and doubling of an asymmetric difference in brake pedal "feel" when taxi brake inhibit is "ON" on one side of the aircraft and "OFF" on the other. In addition, as is illustrated in FIG. 7, showing graphs of pedal displacement ($X_P$) vs. elapsed time (t), and brake force ($F_B$) vs. elapsed time (t), because the taxi brake inhibit feature incorporates a tunable 45% brake force command threshold above which the inhibited brakes are applied, a doubling of the deceleration "bump" results each time the "45% Threshold" is exceeded. These changes in "feel" can be very large and objectionable.

For any taxi brake inhibit implementation it is necessary to set a brake force command threshold above which taxi brake inhibit is shut off. This ensures that all brakes operate during an emergency stop. In setting that threshold it must be set high enough so that the threshold is not exceeded during in-service taxi braking, because a very harsh and objectionable "deceleration bump" occurs when the inhibited brakes suddenly become active. However it must also be set low enough so that skids don't occur during in-service taxi braking due to the brake force being doubly high on the "active" brakes to compensate for the other brakes that are "inhibited", because these skids would also cause harsh and objectionable "deceleration bumps". Certain taxi brake inhibit features only inhibited ⅓ of the brakes at one time, so a threshold could be set that met both criteria—it was high enough to prevent exceeding the threshold during normal taxi braking, and yet low enough to prevent antiskid activity. Another taxi brake inhibit feature inhibits half the brakes at a time, and a threshold level cannot be set that meets both criteria. As a result the taxi brake inhibit feature will cause harsh and objectionable deceleration bumps during normal taxi braking, either due to the idle brakes suddenly applying (threshold too high), or due to antiskid activity (threshold too low) or both.

Certain aircraft incorporate two brake system control units, one for the brakes on the right side of the aircraft and the other for the brakes on the left side, and neither brake system control unit (BSCU) knows what the brake pedal application, Brake Deactivated status, or Antiskid Fault status are for the brakes on the other side. This creates disadvantages for the taxi brake inhibit feature because it allows one side of the aircraft to have taxi brake inhibit operative while the other side is not. During times when taxi brake inhibit is only operative on one side of the aircraft there will be a very significant difference in brake "feel" between the two sides of the aircraft, which will cause the aircraft to pull to one side during taxi braking (toward the side where all brakes are active). This will be very objectionable to the pilot and may also result in significant energy imbalance between the two sides of the aircraft as the pilot tries to compensate with nose steering.

When the taxi brake inhibit is operating the pilot feels a factor-of-two reduction in brake force for a given brake pedal application. This will cause a pronounced "mushy" feeling in the brake pedals. The pedals must therefore be applied twice as hard for every taxi brake application, and prior experience indicates that this will be objectionable to the pilot. In addition, the difference in pedal "feel" from taxi brake inhibit mode to normal braking mode will very pronounced, which prior experience also indicates will be objectionable to the pilot.

There also a potential problem with the forward pitch-over protection. This is currently handled by a time-based algorithm on the brake force vs. brake pedal application curve, and its implementation needs to be readdressed when incorporating the taxi brake inhibit, because the two features are interrelated. In addition, excessive brake wear can occur during non-normal operation of the taxi brake inhibit feature, such as during deactivation of one brake for up to ten days ("BRAKE DEACTIVATED"), loss of antiskid function to one brake ("ANTISKID FWD" or "ANTISKID AFT"), loss of braking to one brake ("BRAKE FWD" or "BRAKE AFT"), loss of antiskid to both brakes ("ANTISKID STATUS"), or loss of braking to both brakes ("BRAKE CONTROLS"). Two non-normal conditions also commonly result in wheel lockups at 50% normal airplane deceleration. Additional electronic brake failure conditions can also occur that the brake system control unit (BSCU) does not typically monitor that will also result in one or more of the these failure effects. It would be desirable to provide an improved taxi brake system for the Boeing 787 aircraft that overcomes such shortcomings of existing taxi brake systems. The present invention meets these and other needs.

SUMMARY OF THE INVENTION

Briefly, and in general terms, the present invention provides for a taxi brake inhibit system and method that solves the problem of discontinuities in pedal "feel" due to application of a taxi brake inhibit feature, by adding a new pedal "feel" logic. More particularly, the present invention provides for a taxi brake inhibit system and method adds a new pedal "feel" logic in which twice the brake force is commanded for a given brake pedal application when taxi brake inhibit is active. Since half the brakes are inhibited at that time, the overall brake pedal "feel" will be the same as when all brakes are active.

The invention employs two different brake force vs. brake pedal application curves for use in braking the aircraft. A "Normal" curve is used when the taxi brake inhibit is inactive and "Taxi Inhibit" curve is used when the taxi brake inhibit is active. The latter curve serves to apply additional braking force for a given brake pedal application so as to compensate for the brakes that are deactivated. As a result, the aircraft will decelerate at the same rate for a given brake pedal application irrespective of whether the taxi brake inhibit is active or inactive. Additionally, undesirable yaw forces will be eliminated should the taxi brake inhibit be activated on only one side of the aircraft. Finally, the brake pedal will have the same "feel" in either mode of operation.

The factor difference between the "Taxi Inhibit" curve and the "Normal" curve can be tuned to account for any non-linearity in the relationship between Brake Torque vs. brake force command for carbon brakes. The transition from the "Normal" curve to the "Taxi Inhibit" curve can be achieved instantly, because it occurs when the are not being applied. On the other hand, the transition form the "taxi brake inhibit" curve to the "Normal" curve is achieved via a transfer function tuned to minimized the change in overall brake force during the transient condition wherein the active brakes are reducing their brake force at the same time the inhibited brakes are applying.

The present invention also provides for a system and method that solves the problems encountered during non-normal operation of the taxi brake inhibit feature. For Brake Deactivated, taxi brake inhibit is shut OFF, and due to requirements for BSCU partitioning, taxi brake inhibit is shut OFF only to the affected fore-aft brake pair. For any other non-normal condition taxi brake inhibit remains ON. During non-normal conditions, according to the invention, the recommended solution to wheel lock-ups at 50% normal airplane deceleration is to shut OFF taxi brake inhibit to both adjacent fore-aft brake pairs if any non-normal condition exists on either pair.

In addition, according to the present invention, the brake system control unit (BSCU) is modified to read electronic brake actuation controller (EBAC) status messages that indicate non-normal EBAC operation, and to share non-normal status between the two fore-aft brake pairs on a landing gear. In addition, the taxi brake inhibit feature is shut OFF to both fore-aft brake pairs if any non-normal condition exists on either pair.

Accordingly, the present invention provides for a system for controlling a taxi brake inhibit mode of operation of an aircraft brake system. The aircraft brake system includes at least one landing gear, and each landing gear includes a forward pair of wheel brakes and an aft pair of wheel brakes. During taxi brake inhibit mode at least some of the wheel brakes are deactivated from braking notwithstanding a brake pedal command for a commanded braking force. The system for controlling a taxi brake inhibit mode includes at least one electronic brake actuation controller operatively connected to at least one landing gear and configured to control the operation of the forward and aft pairs of wheel brakes of the landing gear, and a brake system control unit operative to receive a brake pedal command for a commanded braking force. The brake system control unit is connected to the electronic brake actuation controller and is operative to control the electronic brake actuation controller to generate a braking force greater than the commanded braking force of the brake pedal command. In a presently preferred aspect, half of the wheel brakes are deactivated during the taxi brake inhibit mode, and the brake system control unit is operative to control the electronic brake actuation controller to generate twice the commanded braking force of the brake pedal command during the taxi brake inhibit mode.

In another presently preferred aspect, the electronic brake actuation controller is operative to generate a status message indicating non-normal operation of the electronic brake actuation controller, and the brake system control unit is connected to the electronic brake actuation controller to receive the status message indicating non-normal operation of the electronic brake actuation controller. In another presently preferred aspect, the brake system control unit is operative to shut off taxi brake inhibit mode to the forward and aft pairs of wheel brakes of the landing gear responsive to the status message indicating non-normal operation of the electronic brake actuation controller.

The present invention also provides for a method for controlling a taxi brake inhibit mode of operation of an aircraft brake system, which involves generating a brake pedal command for a commanded braking force for a forward pair of wheel brakes and an aft pair of wheel brakes of at least one landing gear, receiving the brake pedal command, and controlling actuation of the forward pair of wheel brakes and the aft pair of wheel brakes of the landing gear to generate a braking force greater than the commanded braking force of the brake pedal command to compensate for at least some of the wheel brakes being deactivated during the taxi brake inhibit mode responsive to the brake pedal command. In a presently preferred aspect, the step of controlling actuation of the forward pair of wheel brakes and the aft pair of wheel brakes includes generating a commanded braking force according to a first pedal command vs. brake force curve when the taxi brake inhibit mode is inactive, and controlling actuation of the forward pair of wheel brakes and the aft pair of wheel brakes to generate a commanded braking force greater than the brake pedal command during the taxi brake inhibit mode according to a second pedal command vs. brake force curve.

In another presently preferred aspect, the second pedal command vs. brake force curve applies twice the brake force for a given brake pedal application. In another presently preferred aspect, the step of controlling actuation of the forward pair of wheel brakes and the aft pair of wheel brakes involves transitioning from the first pedal command vs. brake force curve to the second pedal command vs. brake force curve when the wheel brakes are not applied. In another presently preferred aspect, the step of controlling actuation of the forward pair of wheel brakes and the aft pair of wheel brakes involves transitioning from the second pedal command vs. brake force curve to the first pedal command vs. brake force curve via a transfer function tuned to minimize a change in overall brake force while active brakes are reducing their brake force at the same time the inhibited brakes are applying. In another presently preferred aspect, the step of controlling actuation of the forward pair of wheel brakes and the aft pair of wheel brakes involves transitioning from the second pedal command vs. brake force curve to the first pedal command vs. brake force curve via a time delay that approximates a delay, such as approximately 0.3 seconds, for example, with which the deactivated brakes reapply. In another presently preferred aspect, half of the wheel brakes are deactivated during the taxi brake inhibit mode, and the step of controlling actuation of the forward pair of wheel brakes and the aft pair of wheel brakes involves controlling actuation of the forward pair of wheel brakes and the aft pair of wheel brakes to generate twice the commanded braking force of the brake pedal command during the taxi brake inhibit mode.

In another presently preferred aspect, the method of the invention also involves generating a status message indicating non-normal operation of actuation of the forward pair of wheel brakes and the aft pair of wheel brakes of the landing gear, receiving the status message indicating non-normal operation, and shutting off taxi brake inhibit mode to the forward and aft pairs of wheel brakes of the landing gear responsive to the status message indicating non-normal operation.

These and other features and advantages of the present invention will become apparent from the following detailed description of the preferred embodiments which, taken in conjunction with the accompanying drawings, illustrate by way of example the principles of the invention.

BRIEF DESCRIPTION OF THE DRAWINGS

FIG. 3 is a diagram illustrating pedal "feel" of a Boeing 787 aircraft taxi brake system without application of a conventional taxi brake inhibit system.

FIG. 4 is a diagram illustrating pedal "feel" of a Boeing 787 aircraft taxi brake system with application of a conventional taxi brake inhibit system.

FIG. 7 is a diagram illustrating comparison of deceleration "bump" of a Boeing 787 aircraft taxi brake system with application of a conventional taxi brake inhibit system.

FIG. 8 is a diagram illustrating comparison of deceleration "bump" of a Boeing 787 aircraft taxi brake system with application of a taxi brake inhibit system according to the system and method of the invention.

FIG. 19 is a summary comparison of current conventional operation of a Boeing 787 aircraft taxi brake inhibit system and operation of a Boeing 787 aircraft taxi brake inhibit system according to the system and method of the invention.

DETAILED DESCRIPTION OF THE PREFERRED EMBODIMENTS

Figure 1:
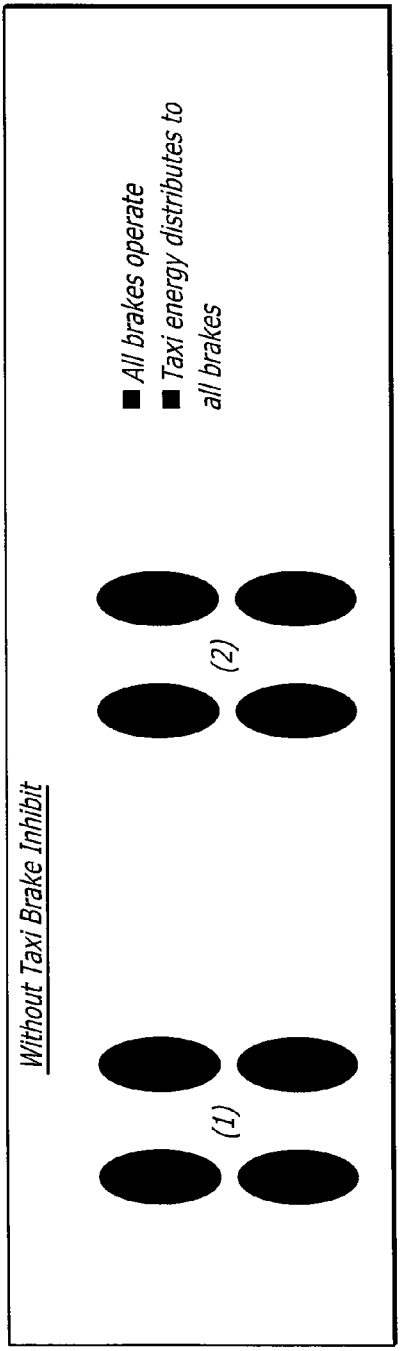
FIG. 1 is a diagram illustrating operation of a Boeing 787 aircraft taxi brake system without application of a conventional taxi brake inhibit system.
Figure 2:
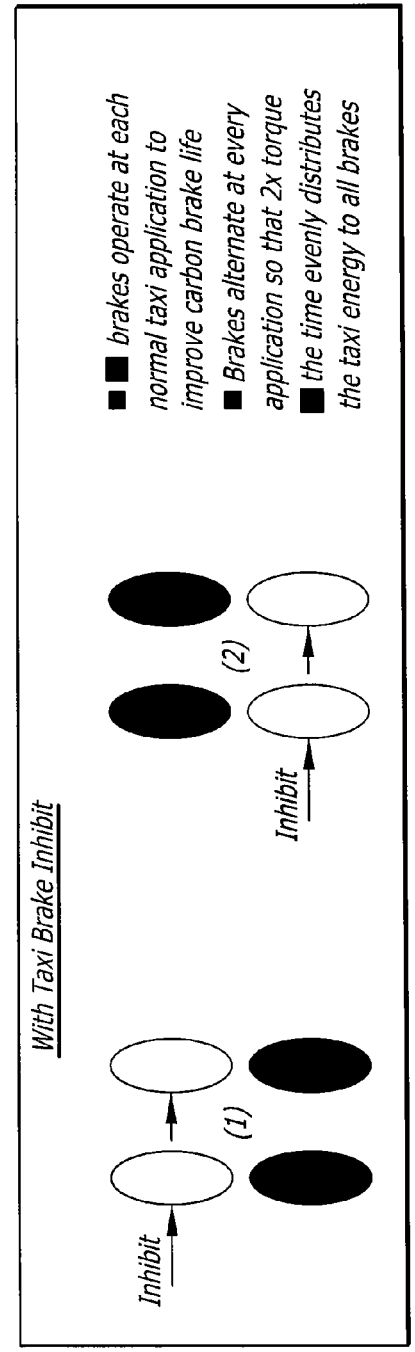
FIG. 2 is a diagram illustrating operation of a Boeing 787 aircraft taxi brake system with application of a conventional taxi brake inhibit system.
Figure 5:
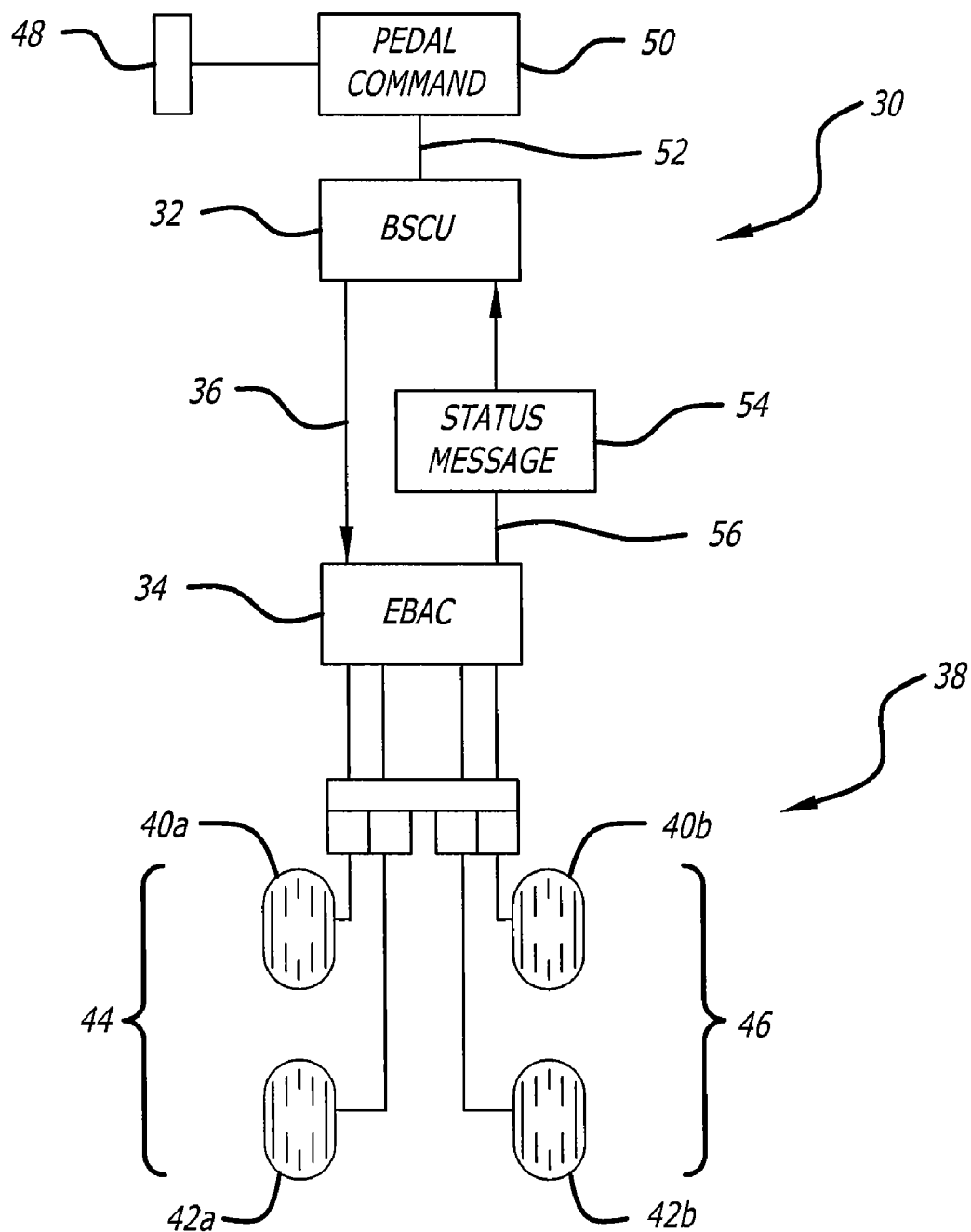
FIG. 5 is a schematic diagram of a system controlling a taxi brake inhibit mode of operation of an aircraft brake system, according to the present invention.

With reference to the drawings, which are provided by way of example, and not by limitation, the present invention provides for a system and method for controlling a taxi brake inhibit mode of aircraft brakes. Referring to FIG. 5, the system 30 for controlling a taxi brake inhibit mode during operation of aircraft brakes typically includes a brake system control unit (BSCU) 32 configured to control an electronic brake actuation controller (EBAC) 34, to which the brake system control unit is electrically connected by system bus 36. In turn, the electronic brake actuation controller is configured to control the operation of a landing gear, such as a landing gear 38, including a forward pair of wheel brakes 40a, 40b, to which the electronic brake actuation controller is connected, and an aft pair of wheel brakes 42a, 42b, to which the electronic brake actuation controller is connected. The forward and aft pairs of wheel brakes thus also form groups of a left fore-aft pair of wheel brakes 44, and a right fore-aft pair of wheel brakes 46. The position of the aircraft brake pedal 48 operated by a pilot is typically read by a microcontroller 50 that generates a brake pedal command signal 52 for a commanded braking force, and the pedal command signal is received by the brake system control unit. Status messages 54 indicating non-normal operation of the electronic brake actuation controller are received by the brake system control unit over the system bus 56.

The system and method of the present invention provide a solution to the problem of discontinuities in pedal "feel" due to application of a taxi brake inhibit feature, by adding a new pedal "feel" logic, in which twice the brake force is commanded for a given brake pedal application when taxi brake inhibit is active. Since half the brakes are inhibited at that time, the overall brake pedal "feel" will be the same as when all brakes are active.

The following simple logic implements this feature:
Taxi brake inhibit (TBI) logic for each side of the aircraft:
Logic:
"TBI Enable" enables the TBI to both the forward and aft brake pairs on that side of the aircraft IF:
The brake force command is <50%, AND
The speed is <45 knots, AND
The landing autobrakes are not applied, AND
The RTO autobrakes are not applied, AND
No brake is "Deactivated", AND
No brake indicates an "Antiskid Fault", AND
Either: The brake pedal application is <10%, —OR—The "TBI Enable" command is present.
"Fwd TBI On" Inhibits application of the forward brake pair (i.e. enables TBI to the forward brake pair) IF:
A "TBI Enable" command is present, AND
The "Brake Pair Select" is "On" (i.e. the forward brake pair is selected), AND
The "Aft TBI On" command is not present, AND
Either: The brake pedal application is >20%, —OR—The "Fwd TBI On" command is present.
"Aft TBI On" inhibits application of the aft brake pair (i.e. enables TBI to the aft brake pair) IF:
A "TBI Enable" command is present, AND
The "Brake Pair Select" is "Off" (i.e. the aft brake pair is selected), AND
The "Fwd TBI On" command is not present, AND
Either: The brake pedal application is >20%, —OR—The "Aft TBI On" command is present.
"Brake Pair Select" Whenever the BSCU is powered on, either the forward or aft brake pair is selected, but never both:
When "Brake Pair Select" is "On" the forward brake pair is selected. When "Brake Pair Select" is "Off" the aft brake pair is selected. The "Brake Pair Select" is initially set to "On" at BSCU power-on (this arbitrarily selects the forward brake pair to start with).

The "Brake Pair Select" is commanded "Off" (i.e. the aft brake pair is selected) when: The "Fwd TBI On" command is first present—THEN—the brake pedal application is <10%

The "Brake Pair Select" is commanded "On" (i.e. the forward brake pair is selected) when: The "Aft TBI On" command is first present—THEN—the brake pedal application is <10%

Debounce: Each of the above logic signals should be "debounced" to prevent a momentary spurious signal from executing the logic. For example, the "brake pedal application >50%" signal is present for 5 or 10 frames before being recognized it as valid.

Features:
The "TBI Enable" logic ensures that taxi brake inhibit is only active during normal taxi braking If the "TBI Enable" command is not present, the taxi brake inhibit feature is not operative (i.e. all brakes are fully operative). The "TBI Enable" command is not present when any of the following conditions occur:

1) Any time the brake force command from the brake pedal exceeds 50% (This ensures that all brakes are active for emergency stops).

2) The aircraft speed exceeds 45 knots. (This ensures all brakes operate during higher energy stops so that the higher energy is distributed equally amongst all the brakes).

3) The landing or RTO autobrakes are applied. (This ensures all brakes operate during higher energy stops so that the higher energy is distributed equally amongst all the brakes).

4) Any brake is Deactivated (This ensures that brake "feel" does not change with each successive taxi brake application. This also ensures that the other brake on the same axle does not see the taxi energy double and the braking force on one brake multiply by 4 times its "no-inhibit" value to compensate for its axle mate being inoperative. Note that operating with a brake deactivated is an infrequent event, so shutting off taxi brake inhibit during Brake Deactivation does not significantly affect overall brake wear).

5) Any brake has an Antiskid Fault (This ensures that wheel lockups don't occur as a result of the braking force on the two "active" brakes being 2 times higher than their "no-inhibit" value to compensate for the other two brakes being inhibited. Shutting off taxi brake inhibit to all four brakes on one side, even if an Antiskid fault occurs on only one brake, ensures that brake "feel" does not change with each successive taxi brake application. Note that operating with an Antiskid Fault is an infrequent event, so shutting off Taxi Inhibit when an Antiskid fault is present should not significantly affect overall brake wear).

6) The brake pedal application drops below 10%—OR—The "TBI Enable" command is present (This ensures that when manual braking is applied above 45 knots, the taxi brake inhibit won't then suddenly kick in and release ½ the brakes as the aircraft decelerates through 45 knots. Once the aircraft is below 45 knots and the brake pedal is released, the taxi brake inhibit will then be active for each subsequent "normal" taxi brake application. This logic also ensures that after an "emergency" manual brake application, where all brakes are active, all brakes will remain active until the brake pedal is released. Then taxi brake inhibit may resume for each subsequent "normal" taxi brake application).

7) The "Fwd TBI On" and "Aft TBI On" logic alternately inhibit the forward and aft side-by-side brake pair on one side of the aircraft provided all the "TBI Enable" conditions are met. This reduces the number of brakes that are active during a typical taxi brake application, thus reducing brake wear. If selected, one (and only one) of the two brake pairs is inhibited from applying when the brake pedal is applied sufficiently to command brake application. Once inhibited, the brake pair remains latched in the "inhibit" condition until either the "TBI Enable" is no longer present (e.g. Antiskid fault, emergency braking applied, etc.) or until the brake pedal is released (which causes the "Brake Pair Select" logic to deselect that brake pair and select the other brake pair to be inhibited on the next taxi application). A brake application is defined as the pedal angle exceeding 20%, and a brake release is defined as the pedal angle dropping below 10%. These values are, or course, tunable but should remain reasonably separate to prevent "fluttering logic" when the brake pedal hovers near brake release.

8) The "Brake Pair Select" logic always selects either the forward or aft brake pair for TBI, but never both. The logic arbitrarily selects the forward brake pair at BSCU power-on, then switches to the other pair each time the taxi brake inhibit is applied to one brake pair and then the brake pedal is released. This causes the taxi brake inhibit to alternate between the forward and aft brake pairs being inhibited on each successive taxi brake pedal application to promote energy balance.

Figure 6:
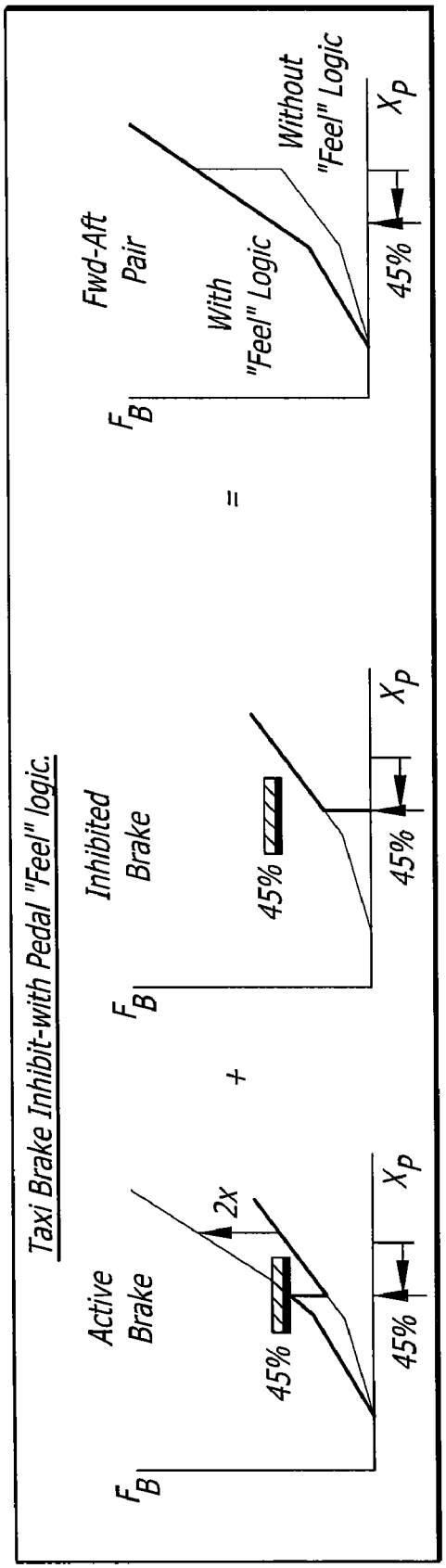
FIG. 6 is a diagram illustrating comparison of pedal "feel" of a Boeing 787 aircraft taxi brake system with and without application of a taxi brake inhibit system according to the system and method of the invention.

Referring to FIGS. 3-4 and 6, the present invention:

Incorporates two brake force vs. brake pedal application curves.

One curve is the "Normal" curve that is currently incorporated. This curve is used whenever taxi brake inhibit is not active.

The other curve is a "Taxi Inhibit" curve. This curve applies twice the brake force for a given brake pedal application and is used whenever taxi brake inhibit is active. The factor of difference between the "Taxi Inhibit" and "Normal" curves can be tuned to account for any non-linearity in the relationship between brake torque vs. brake force command for the carbon brakes.

The transition from the "Normal" curve to the "Taxi Inhibit" curve can be done instantly, because it occurs when the brakes are not applied.

The transition from the "Taxi Inhibit" curve to the "Normal" curve should be done via a "transfer function" tuned to minimize the change in overall brake force during the transient condition where the two active brakes are reducing their brake force at the same time the two inhibited brakes are applying. The "transfer function" would transition the "Taxi Inhibit" curve back to the "Normal" curve via a curve vs. time relationship, such that the brake force on the two brakes that had been applied via the "Taxi Inhibit" curve reduce their brake force at the same rate that the brake force is being applied on the two brakes that were released. This should be simple to do to a point where the deceleration bump is reduced to a level that is not objectionable.

Features:

There should be no significant deceleration bump when brake pedal application exceeds the brake force "threshold" and the previously-inhibited brakes suddenly become active. The relationship between overall brake force and brake pedal application would be the same before and after the threshold is exceeded, and the "transfer function" would minimize or virtually eliminate any deceleration bump that my occur during the transition. This would have the added benefit of allowing the brake force threshold to be set lower—to minimize the exposure to skids during normal taxi braking—without introducing a deceleration bump when exceeding the threshold. So, a single "Threshold" value can be set that meets both criteria for the threshold.

The result—the flight crew should experience much smoother taxi braking with no objectionable "deceleration bumps" due to skid activity or when applying harder braking.

There would no longer be the problem associated with the taxi brake inhibit being active on one side of the aircraft while it is not active on the other side. Since the pedal feel vs. overall brake force for each side of the aircraft remains the same either way, the flight crew experiences no change in the handling the aircraft during such a time, and the energy balance problem between the two sides of the aircraft is eliminated.

The result—the flight crew should not experience a significant and objectionable difference in brake feel between the two sides of the aircraft at times when one BSCU is in the TAXI Brake Inhibit mode and the other is not.

There should be a negligible difference in brake pedal "feel" between "Normal" braking and "Taxi Inhibit" braking The result—the flight crew should not experience "mushy" feel during taxi braking, and a single optimum pedal feel can be provided in both "Normal" and "Taxi Brake Inhibit" modes.

When taxi brake inhibit is commanded "ON", command twice "normal" brake force. This will not cause a deceleration "bump," because this transition occurs only when the brakes are not applied. Conversely, as is illustrated in FIG. 8, showing graphs of pedal displacement ($X_P$) vs. elapsed time (t), and brake force ($F_B$) vs. elapsed time (t), one way to mitigate the problem of a deceleration "bump" when taxi brake inhibit is commanded "OFF" each time the "45% Threshold" is exceeded, is to transition the doubling of the brake force command back to "normal" via a time delay that approximates the delay with which the inhibited brakes reapply (on the order of 0.3 second). With no time delay, this transition would cause a deceleration "bump" comparable to an antiskid cycle. The time delay reduces the deceleration "bump" to a level that is so small as to be unnoticeable.

As is illustrated in FIGS. 3, 4 and 6, the proposed new pedal "feel" logic completely solves the problem-brake pedal "feel" is always the same, whether taxi brake inhibit is "ON" or "OFF." There is no longer a large change in brake pedal "feel" between times when taxi brake inhibit is "ON" and "OFF;" no longer a large asymmetric difference in brake pedal "feel" when taxi brake inhibit is "ON" on one side of the aircraft and "OFF" on the other; and no longer a large deceleration "bump" each time the "45% Threshold" is exceeded.

Figure 9:
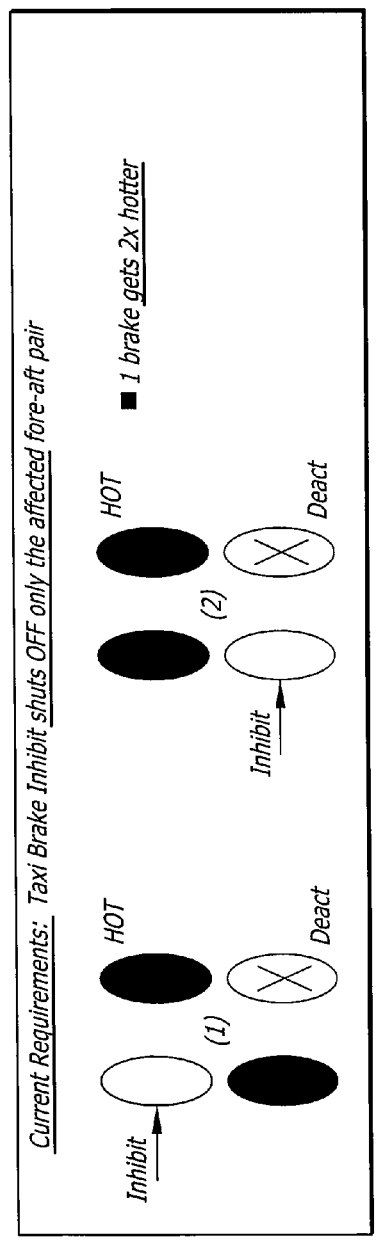
FIG. 9 is a diagram illustrating operation of a Boeing 787 aircraft taxi brake with a brake deactivated with application of a conventional taxi brake inhibit system.
Figure 11:
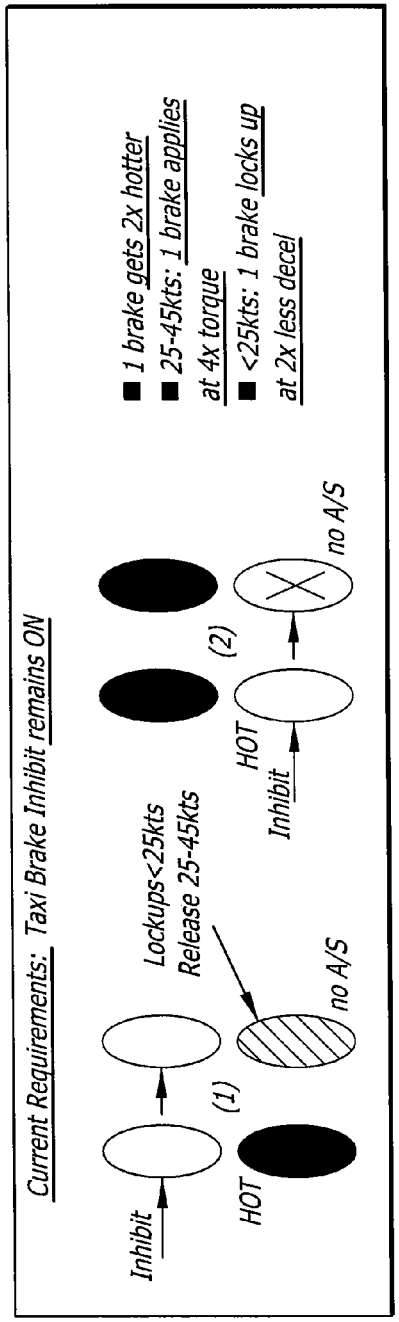
FIG. 11 is a diagram illustrating operation of a Boeing 787 aircraft taxi brake with loss of antiskid to one brake with application of a conventional taxi brake inhibit system.
Figure 13:
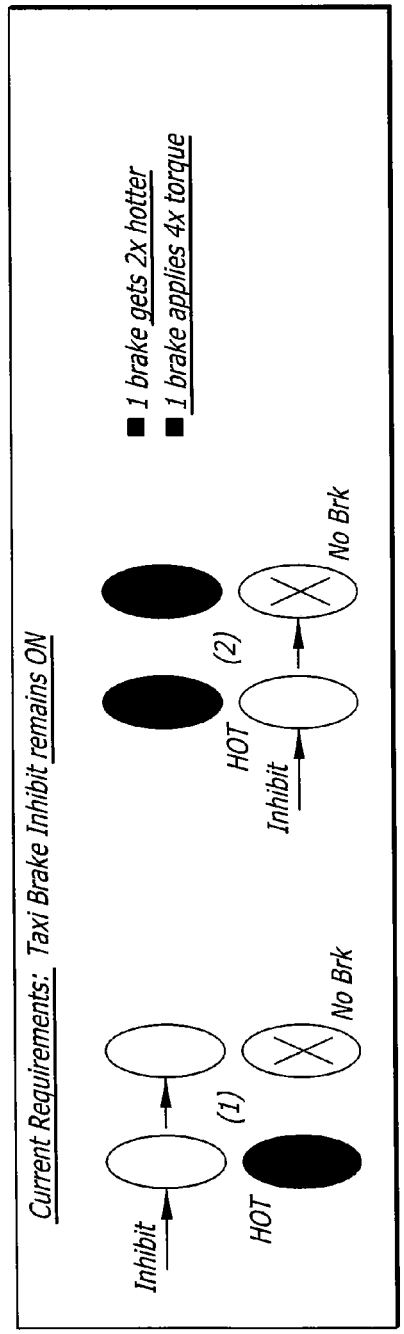
FIG. 13 is a diagram illustrating operation of a Boeing 787 aircraft taxi brake with loss of braking to one brake with application of a conventional taxi brake inhibit system.
Figure 15:
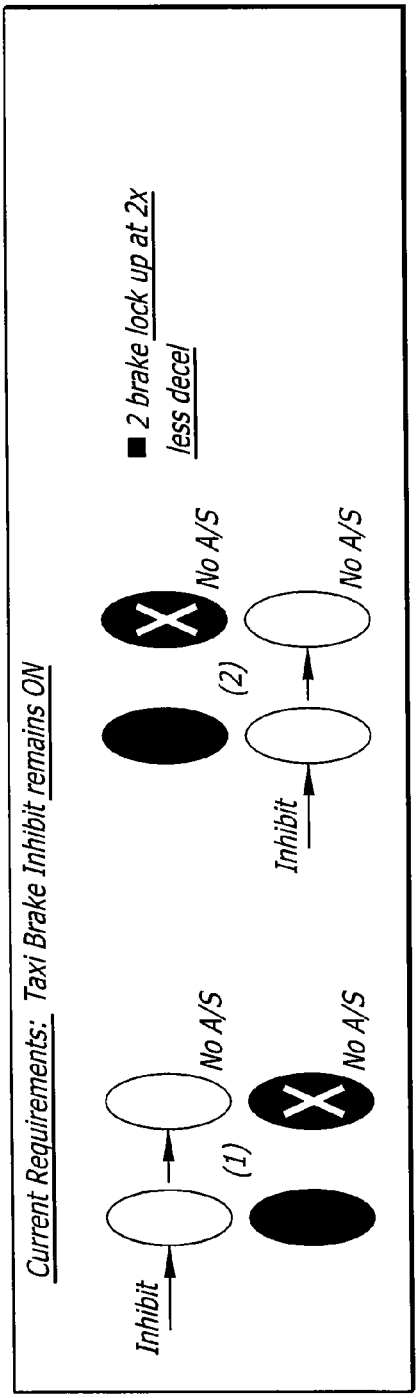
FIG. 15 is a diagram illustrating operation of a Boeing 787 aircraft taxi brake with loss of antiskid to a fore-aft pair of brakes with application of a conventional taxi brake inhibit system.
Figure 17:
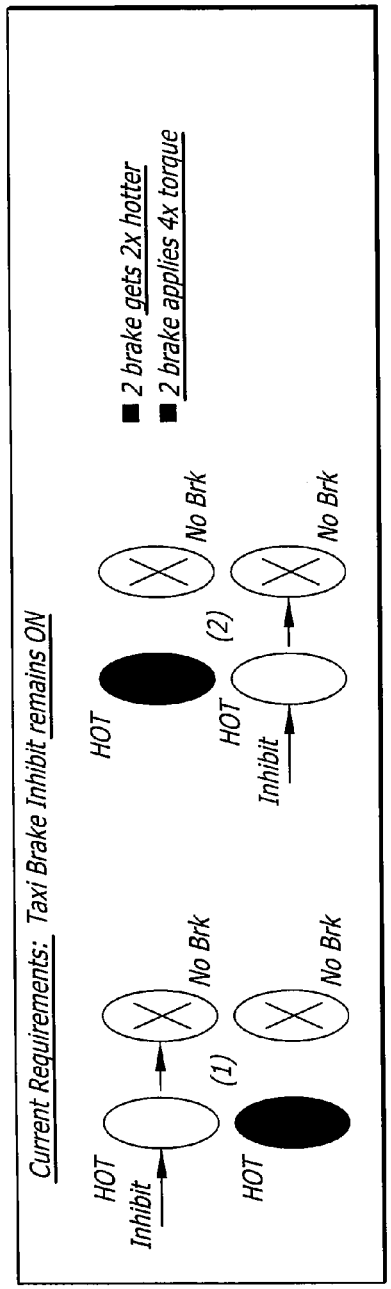
FIG. 17 is a diagram illustrating operation of a Boeing 787 aircraft taxi brake with loss of braking to a fore-aft pair of brakes with application of a conventional taxi brake inhibit system.

Excessive brake wear can occur during non-normal operation of the taxi brake inhibit feature, such as during deactivation of one brake for up to ten days ("BRAKE DEACTIVATED"), loss of antiskid function to one brake ("ANTISKID FWD" or "ANTISKID AFT"), loss of braking to one brake ("BRAKE FWD" or "BRAKE AFT"), loss of antiskid to both brakes ("ANTISKID STATUS"), or loss of braking to both brakes ("BRAKE CONTROLS"). During deactivation of one brake for up to ten days ("BRAKE DEACTIVATED"), illustrated in FIG. 9, one brake may become two times hotter due to continued usage during taxi braking During loss of antiskid function to one brake ("ANTISKID FWD" or "ANTISKID AFT"), illustrated in FIG. 11, one brake may become two times hotter, between 25 and 45 knots one brake may apply four times normal torque, and at less than 25 knots one brake may lock up at half the normal deceleration. During loss of braking to one brake ("BRAKE FWD" or "BRAKE AFT"), illustrated in FIG. 13, one brake may become two times hotter due to continued usage during taxi braking and one brake may apply four times normal torque. During loss of antiskid to both brakes ("ANTISKID STATUS"), illustrated in FIG. 15, two brakes may lock up at half the normal deceleration. During loss of braking to both brakes of a fore and aft pair of brakes, ("BRAKE CONTROLS"), illustrated in FIG. 17, two brakes may become two times hotter, and two brakes may apply four times normal torque. Additional electronic brake failure conditions can also occur that the brake system control unit (BSCU) does not typically monitor that will also result in one or more of the these failure effects.

For the non-normal taxi brake inhibit condition Brake Deactivated, taxi brake inhibit is shut OFF, and, due to requirements for BSCU partitioning, taxi brake inhibit is shut OFF only to the affected fore-aft brake pair. For any other non-normal condition, taxi brake inhibit remains ON. This makes Boeing 787 aircraft non-normal taxi brake inhibit operation much less benign than any other model. Referring to FIGS. 9, 11, 13, 15 and 17, and as is summarized in FIG. 19, all but one non-normal taxi brake inhibit condition results in a doubling of brake overheating during taxi braking (i.e. the same doubling of brake overheating that would occur if taxi brake inhibit always inhibited the same brakes). All but two non-normal taxi brake inhibit conditions result in only one brake operating on a landing gear, with that brake applying four times the normal torque. Two non-normal taxi brake inhibit conditions result in wheel lockups at 50% normal airplane deceleration. During non-normal taxi brake inhibit conditions, according to the invention, the recommended solution will be to shut OFF taxi brake inhibit to both adjacent fore-aft brake pairs if any non-normal taxi brake inhibit condition exists on either pair.

In the taxi brake system of the invention, the foregoing non-normal taxi brake inhibit operation problems can be solved by having the BSCU read the electronic brake actuation controller (EBAC) status messages that indicate non-normal EBAC operation, as illustrated in FIG. 5, since these messages are typically available on the bus. The BSCU partitioning should also be modified to share non-normal taxi brake inhibit status between the two fore-aft brake pairs on a landing gear, and the taxi brake inhibit feature should be shut OFF to both fore-aft brake pairs if any non-normal condition exists on either pair.

Figure 10:
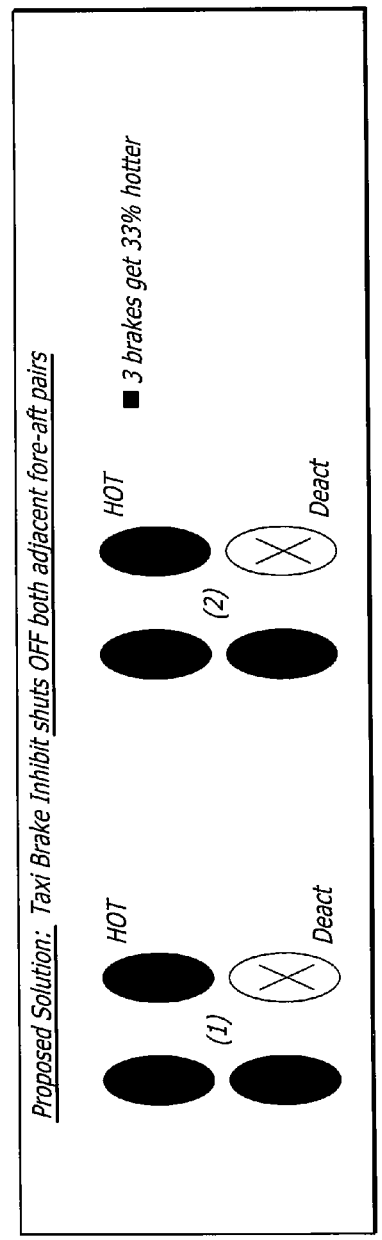
FIG. 10 is a diagram illustrating operation of a Boeing 787 aircraft taxi brake with a brake deactivated with application of a taxi brake inhibit system according to the system and method of the invention.
Figure 12:
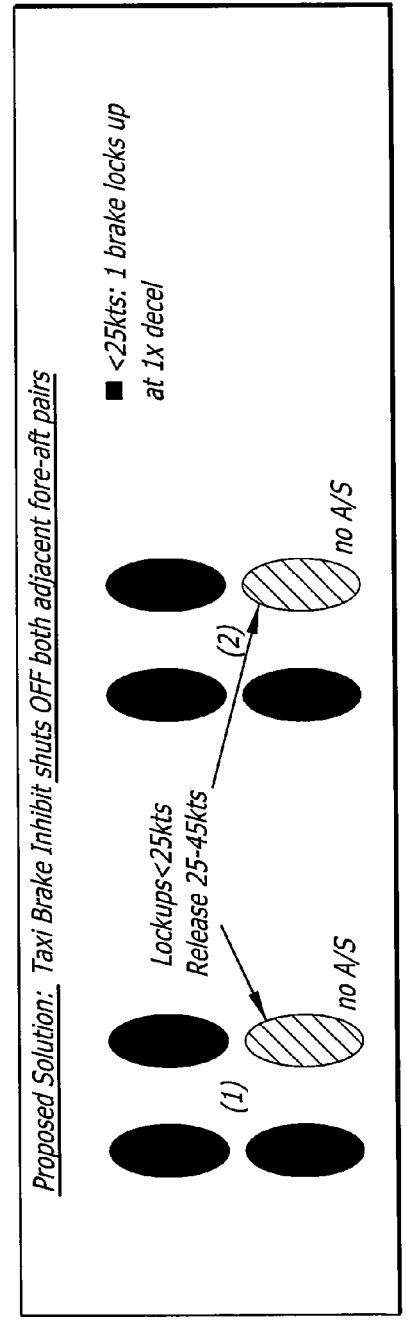
FIG. 12 is a diagram illustrating operation of a Boeing 787 aircraft taxi brake with loss of antiskid to one brake with application of a taxi brake inhibit system according to the system and method of the invention.
Figure 14:
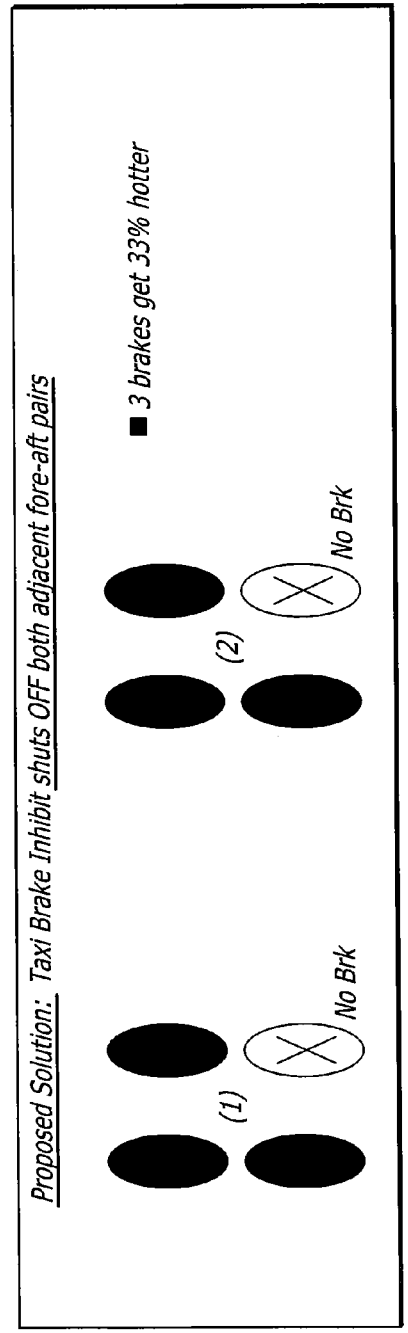
FIG. 14 is a diagram illustrating operation of a Boeing 787 aircraft taxi brake with loss of braking to one brake with application of a taxi brake inhibit system according to the system and method of the invention.
Figure 16:
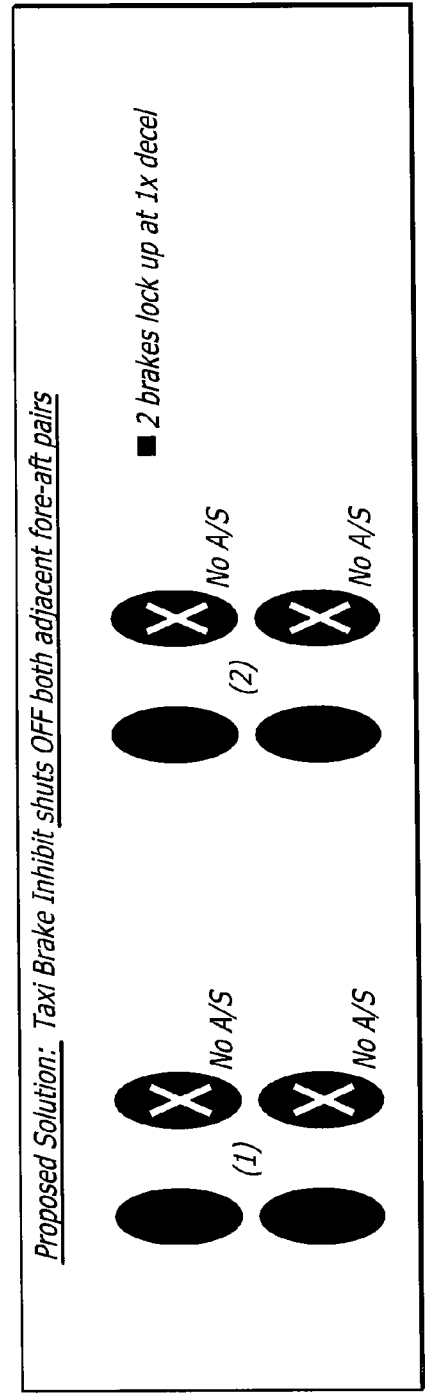
FIG. 16 is a diagram illustrating operation of a Boeing 787 aircraft taxi brake with loss of antiskid to a fore-aft pair of brakes with application of a taxi brake inhibit system according to the system and method of the invention.
Figure 18:
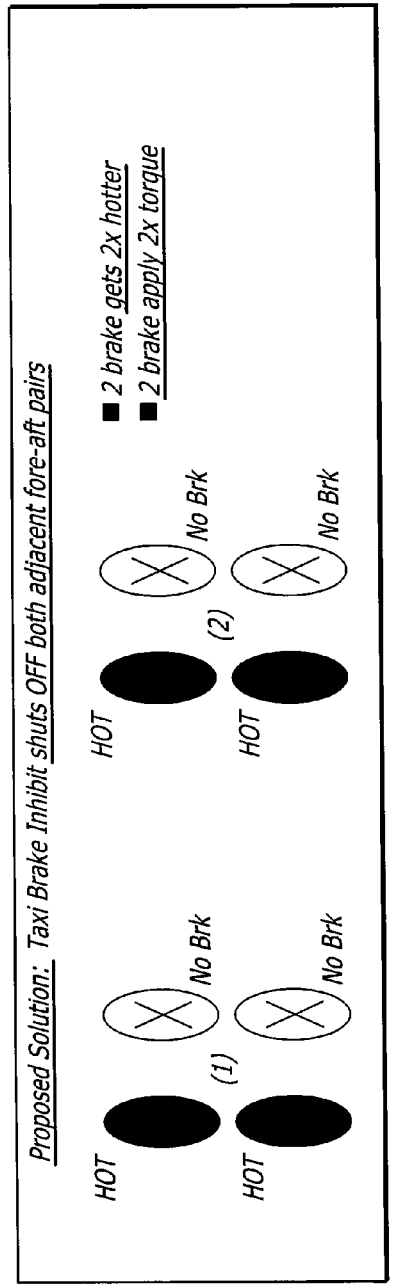
FIG. 18 is a diagram illustrating operation of a Boeing 787 aircraft taxi brake with loss of braking to a fore-aft pair of brakes with application of a taxi brake inhibit system according to the system and method of the invention.

During deactivation of one brake for up to ten days ("BRAKE DEACTIVATED"), illustrated in FIG. 10, three brakes may become 33% hotter. During loss of antiskid function to one brake ("ANTISKID FWD" or "ANTISKID AFT"), illustrated in FIG. 12, at less than 25 knots one brake may lock up at the normal deceleration. During loss of braking to one brake ("BRAKE FWD" or "BRAKE AFT"), illustrated in FIG. 14, three brakes may become 33% hotter. During loss of antiskid to both brakes ("ANTISKID STATUS"), illustrated in FIG. 16, two brakes may lock up at the normal deceleration. During loss of braking to both brakes of a fore and aft pair of brakes, ("BRAKE CONTROLS"), illustrated in FIG. 18, two brakes may become two times hotter, and two brakes may apply two times normal torque.

These modifications completely solve the problems associated with non-normal operation of the taxi brake inhibit feature, and with these modifications the consequences of non-normal taxi brake inhibit operation are benign. In addition, shutting OFF taxi brake inhibit during "Non-Normal" operation does not materially affect its extension of carbon brake life, since "Non-Normal" operation typically occurs only a small percent of the time.

In light of the foregoing, it should be appreciated that by implementation of the system and method according to the invention, the proposed new pedal "feel" logic completely solves the problem of discontinuities in brake pedal "feel," since brake pedal "feel" will be always the same, whether taxi brake inhibit is "ON" or "OFF." There is no longer a large change in brake pedal "feel" between times when taxi brake inhibit is "ON" and "OFF;" no longer a large asymmetric difference in brake pedal "feel" when taxi brake inhibit is "ON" on one side of the aircraft and "OFF" on the other; and no longer a large deceleration "bump" each time the "45% Threshold" is exceeded. It should also be appreciated that by implementation of the system and method according to the invention, during non-normal taxi brake inhibit operation, the significant problems of brake overheating due to doubling of brake overheating during taxi braking, application of four times the normal brake torque such as when only one brake on a landing gear is applied, and exposure to wheel lockups would be eliminated.

While particular forms of the invention have been described and illustrated, it will also be apparent to those skilled in the art that various modifications can be made without departing from the spirit and scope of the invention. Accordingly, it is not intended that the invention be limited, except as by the appended claims.

We claim:

1. A system for controlling a taxi brake inhibit mode of operation of an aircraft brake system, the aircraft brake system including at least one landing gear, each of said at least one landing gear including a forward pair of wheel brakes and an aft pair of wheel brakes, at least some of said wheel brakes being deactivated from braking notwithstanding a brake pedal command for a commanded braking force during said taxi brake inhibit mode, the system comprising:

at least one electronic brake actuation controller operatively connected to said at least one landing gear and configured to control the operation of said forward and aft pairs of wheel brakes of said at least one landing gear, said at least one electronic brake actuation controller being operative to generate a status message indicating non-normal operation of said at least one electronic brake actuation controller; and a brake system control unit operative to receive a brake pedal command for a commanded braking force, said brake system control unit being connected to said at least one electronic brake actuation controller and operative to control said at least one electronic brake actuation controller to generate a braking force greater than the commanded braking force of the brake pedal command, said brake system control unit being connected to said at least one electronic brake actuation controller to receive said status message indicating non-normal operation of said at least one electronic brake actuation controller.

2. The system of claim 1, wherein half of said wheel brakes are deactivated during said taxi brake inhibit mode, and said brake system control unit is operative to control said at least one electronic brake actuation controller to generate twice the commanded braking force of the brake pedal command during said taxi brake inhibit mode.

3. The system of claim 1, wherein said brake system control unit is operative to shut off taxi brake inhibit mode to said forward and aft pairs of wheel brakes of said at least one landing gear responsive to said status message indicating non-normal operation of said at least one electronic brake actuation controller.

4. A method for controlling a taxi brake inhibit mode of operation of an aircraft brake system, the aircraft brake system including at least one landing gear, each of said at least one landing gear including a forward pair of wheel brakes and an aft pair of wheel brakes, at least some of said wheel brakes being deactivated from braking notwithstanding a brake pedal command for a commanded braking force during said taxi brake inhibit mode, the method comprising:

generating a brake pedal command for a commanded braking force for a forward pair of wheel brakes and an aft pair of wheel brakes of at least one landing gear; and receiving said brake pedal command; and generating a commanded braking force according to a first pedal command vs. brake force curve when the taxi brake inhibit mode is inactive, and controlling actuation of said forward pair of wheel brakes and said aft pair of wheel brakes to generate a commanded braking force greater than the brake pedal command during said taxi brake inhibit mode according to a second pedal command vs. brake force curve, and transitioning from the first pedal command vs. brake force curve to the second pedal command vs. brake force curve when the wheel brakes are not applied to compensate for at least some of said wheel brakes being deactivated during said taxi brake inhibit mode responsive to said brake pedal command.

5. The method of claim 4, wherein said second pedal command vs. brake force curve applies twice the brake force for a given brake pedal application.

6. The method of claim 4, wherein said step of controlling actuation of said forward pair of wheel brakes and said aft pair of wheel brakes comprises transitioning from the second pedal command vs. brake force curve to the first pedal command vs. brake force curve via a transfer function tuned to minimize a change in overall brake force while active brakes are reducing their brake force at the same time the inhibited brakes are applying.

7. The method of claim 4, wherein said step of controlling actuation of said forward pair of wheel brakes and said aft pair of wheel brakes comprises transitioning from the second pedal command vs. brake force curve to the first pedal command vs. brake force curve via a time delay that approximates a delay with which the deactivated brakes reapply.

8. The method of claim 7, wherein said delay is approximately 0.3 seconds.

9. The method of claim 4, wherein half of said wheel brakes are deactivated during said taxi brake inhibit mode, and said step of controlling actuation of said forward pair of wheel brakes and said aft pair of wheel brakes comprises controlling actuation of said forward pair of wheel brakes and said aft pair of wheel brakes to generate twice the commanded braking force of the brake pedal command during said taxi brake inhibit mode.

10. A method for controlling a taxi brake inhibit mode of operation of an aircraft brake system, the aircraft brake system including at least one landing gear, each of said at least one landing gear including a forward pair of wheel brakes and an aft pair of wheel brakes, at least some of said wheel brakes being deactivated from braking notwithstanding a brake pedal command for a commanded braking force during said taxi brake inhibit mode, the method comprising:

generating a brake pedal command for a commanded braking force for a forward pair of wheel brakes and an aft pair of wheel brakes of at least one landing gear; and receiving said brake pedal command; and controlling actuation of said forward pair of wheel brakes and said aft pair of wheel brakes of said at least one landing gear to generate a braking force greater than the commanded braking force of the brake pedal command to compensate for at least some of said wheel brakes being deactivated during said taxi brake inhibit mode responsive to said brake pedal command;

generating a status message indicating non-normal operation of actuation of said forward pair of wheel brakes and said aft pair of wheel brakes of said at least one landing gear;

receiving said status message indicating non-normal operation; and shutting off taxi brake inhibit mode to said forward and aft pairs of wheel brakes of said at least one landing gear responsive to said status message indicating non-normal operation.

\* \* \* \* \*